(12) United States Patent
Li (10) Patent No.: US 12,508,838 B2
(45) Date of Patent: Dec. 30, 2025

(54) WHEEL ASSEMBLY DEVICE

(71) Applicant: DONGGUAN JINWANG CHILDREN PRODUCTS CO. LTD., Guangdong (CN)

(72) Inventor: Wei Li, Guangdong (CN)

(73) Assignee: DONGGUAN JINWANG CHILDREN PRODUCTS CO. LTD., Guangdong (CN)

( * ) Notice: Subject to any disclaimer, the term of this patent is extended or adjusted under 35 U.S.C. 154(b) by 0 days.

(21) Appl. No.: 18/399,730

(22) Filed: Dec. 29, 2023

(65) Prior Publication Data

US 2024/0123763 A1 Apr. 18, 2024

Related U.S. Application Data

(63) Continuation of application No. PCT/CN2022/101546, filed on Jun. 27, 2022.

(30) Foreign Application Priority Data

Jun. 29, 2021 (CN) .......................... 202121465547.0

(51) Int. Cl.
*B60B 33/06* (2006.01)
(52) U.S. Cl.
CPC .................... *B60B 33/06* (2013.01)
(58) Field of Classification Search
CPC ....... B60B 33/06; B60B 33/066; B60B 33/04; B60B 33/00; B60B 33/0039;
(Continued)

(56) References Cited

U.S. PATENT DOCUMENTS 1,058,837 A * 4/1913 Zikmund ................ B60B 33/06
16/34
2,524,819 A * 10/1950 Mckean .................. B60B 33/06
248/188.2

(Continued)

FOREIGN PATENT DOCUMENTS

CN 206817592 U 12/2017
CN 207237198 U 4/2018
(Continued)

OTHER PUBLICATIONS

International Search Report dated Nov. 3, 2022 in International Application No. PCT/CN2022/101546. English translation attached.

*Primary Examiner* — William L Miller (57) ABSTRACT

Provided is a wheel assembly device. The wheel assembly device includes a connection base, a wheel assembly that is deployable, and a positioning assembly configured to position the wheel assembly. The wheel assembly is movably connected to the connection base and switchable between a deployed position and a storage position. The connection base has a positioning space. The wheel assembly is configured to rotate to an interior of the positioning space when the wheel assembly is at the deployed position, and rotate to an exterior of the positioning space when the wheel assembly is at the storage position. The positioning assembly includes a first positioning member configured to cooperate with the positioning space to position the wheel assembly at the deployed position and a second positioning member configured to cooperate with the first positioning member to position the wheel assembly at the storage position.

9 Claims, 8 Drawing Sheets

(58) Field of Classification Search
CPC ........... B60B 33/0049; B60B 2900/112; B60B 2900/115; A47D 13/043; A47D 3/001; B62B 7/04; B62B 7/044; A63H 33/00
USPC ............................................................ 16/19
See application file for complete search history.

(56) References Cited

U.S. PATENT DOCUMENTS

| | | | | |
|---|---|---|---|---|
| 2,698,454 | A * | 1/1955 | Meyer | B60B 33/06 280/5.2 |
| 4,008,507 | A * | 2/1977 | Smith | B60B 33/06 280/43.24 |
| 4,097,955 | A * | 7/1978 | Foge | A45C 5/146 280/37 |
| 4,397,062 | A * | 8/1983 | Huang | B60B 33/06 16/33 |
| 4,417,738 | A * | 11/1983 | Kendall | B60B 33/06 280/43.24 |
| 4,668,029 | A * | 5/1987 | Maizlish | B60B 33/06 312/351.13 |
| 4,773,123 | A * | 9/1988 | Yu | A45C 5/146 280/37 |
| 4,815,760 | A * | 3/1989 | Dooley | F16M 11/42 280/47.131 |
| 5,203,581 | A * | 4/1993 | Jankowski | B60B 33/045 280/87.051 |
| 5,253,389 | A * | 10/1993 | Colin | B60B 33/066 16/34 |
| 5,347,682 | A * | 9/1994 | Edgerton, Jr. | B60B 33/0039 16/34 |
| 5,533,231 | A * | 7/1996 | Bai | B60B 33/0039 16/34 |
| 5,584,546 | A * | 12/1996 | Gurin | A47B 21/00 312/200 |
| 6,594,856 | B1 * | 7/2003 | Cherukuri | B60B 33/0049 16/33 |
| 8,484,801 | B2 * | 7/2013 | Li | B60B 33/0089 16/18 CG |
| 9,586,442 | B2 * | 3/2017 | Trickle | B60B 33/0005 |
| 11,089,873 | B1 * | 8/2021 | Dawson | B60B 19/12 |
| 12,043,062 | B2 * | 7/2024 | Herman | B60B 33/066 |
| 12,139,186 | B2 * | 11/2024 | Luo | B62B 9/08 |
| 12,240,270 | B2 * | 3/2025 | Scalf | F25D 25/025 |
| 2002/0166202 | A1 * | 11/2002 | Maupin | B60B 33/0039 16/19 |
| 2005/0217071 | A1 * | 10/2005 | Shinner | B60B 33/0028 16/19 |
| 2016/0375726 | A1 * | 12/2016 | Trickle | B62B 1/12 280/43.11 |
| 2020/0155958 | A1 | 5/2020 | Shapiro et al. | |
| 2020/0163467 | A1 | 5/2020 | Baharmand | |
| 2022/0324280 | A1 * | 10/2022 | Sheikh Jafari | B60B 33/0063 |
| 2024/0123764 | A1 * | 4/2024 | Li | B60B 33/06 |
| 2024/0227905 | A1 * | 7/2024 | Luo | B62B 9/24 |
| 2025/0241456 | A1 * | 7/2025 | Ruiz | A47D 13/043 |

FOREIGN PATENT DOCUMENTS

| | | |
|---|---|---|
| CN | 108275181 A | 7/2018 |
| CN | 210018160 U | 2/2020 |
| CN | 212815509 U | 3/2021 |
| CN | 213248007 U | 5/2021 |
| CN | 213449933 U | 6/2021 |
| CN | 215195407 U | 12/2021 |

* cited by examiner

FIG. 8

WHEEL ASSEMBLY DEVICE

CROSS-REFERENCE TO RELATED APPLICATION

The present application is a continuation of International Application No. PCT/CN2022/101546, filed on Jun. 27, 2022, which claims priority to Chinese Patent Application No. 202121465547.0, filed on Jun. 29, 2021, both of which are hereby incorporated by reference in their entireties.

FIELD

The present disclosure relates to the field of children's product technologies, and more particularly, to a wheel assembly device.

BACKGROUND

Children's lives are accompanied by toys, which not only add fun for children but also exercise children's intellectual and physical capacities.

For a conventional children's activity center table, children play at the children's activity center table. To facilitate a movement of the children's activity center table, a bottom of which is provided with a wheel structure. A conventional wheel structure is fixedly connected to the children's activity center table. A roller portion of the wheel structure is in contact with the ground. To make the children's activity center table stable and immobile on the ground, typically, a complicated braking structure needs to be disposed at the wheel structure. In this way, a manufacturing cost of the wheel structure is increased and the wheel structure is likely to be damaged.

In view of this, the wheel structure needs to be improved.

SUMMARY

The present disclosure aims to overcome defects in the related art and provide a wheel assembly device having a simple structure, less likely to be damaged, and at a low manufacturing cost.

Technical solutions of the present disclosure provide a wheel assembly device. The wheel assembly device includes a connection base, a wheel assembly that is deployable, and a positioning assembly configured to position the wheel assembly. The wheel assembly is movably connected to the connection base and switchable between a deployed position and a storage position. The connection base has a positioning space. The wheel assembly is configured to rotate to an interior of the positioning space when the wheel assembly is at the deployed position, and rotate to an exterior of the positioning space when the wheel assembly is at the storage position. The positioning assembly includes a first positioning member configured to cooperate with the positioning space to position the wheel assembly at the deployed position and a second positioning member configured to cooperate with the first positioning member to position the wheel assembly at the storage position. The wheel assembly device arranged in this way has a simple structure and satisfactory structural strength, and is easy to operate.

Further, the first positioning member includes a connection shaft disposed at the connection base and a sliding groove formed at the wheel assembly. The connection shaft is slidably connected to the sliding groove to enable the wheel assembly to move to the interior or the exterior of the positioning space. Two ends of the sliding groove have a first engagement groove and a second engagement groove, respectively. The first engagement groove is located below the second engagement groove. The connection shaft is configured to engage in the first engagement groove when the wheel assembly is at the deployed position, and engage and rotate in the second engagement groove to switch the wheel assembly to the deployed position when the wheel assembly is at the storage position. In this way, a switch of a state of the wheel assembly can be facilitated, and the wheel assembly can be stably positioned at the deployed position and the storage position.

Further, at least one connection opening is formed between the first engagement groove and the second engagement groove. The connection opening has a width smaller than a width of the first engagement groove and/or a width of the second engagement groove. The connection opening is compressed and deformed when the connection shaft passes through the connection opening. The connection opening can block the connection shaft, in such a manner that the connection shaft is less likely to be separated from the first engagement groove or the second engagement groove.

Further, two connection openings are formed between the first engagement groove and the second engagement groove, one of the two connection openings being formed between and in communication with the first engagement groove and the sliding groove, and another one of the two connection openings being formed between and in communication with the second engagement groove and the sliding groove. In this way, the wheel assembly is less likely to be separated from the first engagement groove and the second engagement groove.

Further, the wheel assembly has a deformation space located at a side of the sliding groove to allow for a deformation of the connection opening. Deformability of the connection opening can be increased for ease of operation.

Further, the deformation space includes two through holes spaced apart from each other, the sliding groove being located between the two through holes. In this way, manufacturing and production can be facilitated, and materials for manufacturing can be reduced.

Further, the second positioning member includes a positioning protrusion disposed at the wheel assembly and a positioning portion disposed at the connection base. The positioning protrusion is configured to engage with the positioning portion to position the wheel assembly at the storage position when the wheel assembly is at the storage position. The second positioning member arranged in this way has a simple structure and is at a low manufacturing cost.

Further, the positioning protrusion is an elastic block that has elasticity. In this way, deformability of the positioning protrusion can be improved to facilitate an engagement between the positioning protrusion and the positioning portion.

Further, the connection base is provided with at least two stop plates extending downwards, the positioning space being formed between the two stop plates. When the wheel assembly is at the deployed position, the wheel assembly is inserted into the positioning space, and the connection shaft is engaged in the first engagement groove, the wheel assembly being positioned at the deployed position under an action of the stop plate and the first engagement groove. When the wheel assembly is at the storage position, the connection shaft moves from the first engagement groove into the second engagement groove, the positioning protrusion being engaged with the positioning portion to position the wheel assembly at the storage position. The positioning space arranged in this way has a simple structure and is at a low manufacturing cost.

Further, the wheel assembly includes a roller and a mounting base, the roller being rotatably connected to a lower end of the mounting base, and the mounting base being rotatably connected to the connection base. When the wheel assembly is located at the deployed position, at least part of the mounting base is located in the positioning space, and the roller is located outside the positioning space. When the wheel assembly is located at the storage position, the mounting base is located outside the positioning space. The wheel assembly arranged in this way has satisfactory structural strength and is less likely to be damaged.

With the above-mentioned technical solutions, the following advantageous effects can be provided.

The technical solutions of the present disclosure provide the wheel assembly device. The wheel assembly device includes the connection base, the wheel assembly that is deployable, and the positioning assembly configured to position the wheel assembly. The wheel assembly is movably connected to the connection base and switchable between the deployed position and the storage position. The connection base has the positioning space. The wheel assembly is rotated to the interior of the positioning space when the wheel assembly is at the deployed position. The wheel assembly is rotated to the exterior of the positioning space when the wheel assembly is at the storage position. The positioning assembly includes the first positioning member and the second positioning member. The first positioning member is configured to cooperate with the positioning space to position the wheel assembly at the deployed position. The second positioning member is configured to cooperate with the first positioning member to position the wheel assembly at the storage position. The wheel assembly device has a simple structure and is at a reduced manufacturing cost. Under an action of the positioning space, the first positioning member, and the second positioning member, the wheel assembly can be kept stable at the deployed position and the storage position, which facilitates use.

BRIEF DESCRIPTION OF THE DRAWINGS

Contents of the present disclosure will become more understandable through referring to the accompanying drawings. It should be understood that these accompanying drawings are used for descriptive purposes only and are not intended to constitute a limitation on the protection scope of the present disclosure.

CROSS-REFERENCE TABLE OF REFERENCE NUMERALS OF THE ACCOMPANYING DRAWINGS wheel assembly device 10;
connection base 1; positioning space 11; stop plate 12; ball socket 13;
wheel assembly 2; roller 21; mounting base 22; connection shaft 3;
sliding groove 4; first engagement groove 41; second engagement groove 42; connection opening 43;
deformation space 5; positioning protrusion 6; positioning portion 7.

DETAILED DESCRIPTION

Specific embodiments of the present disclosure are further described below in conjunction with the accompanying drawings.

It can be appreciated that according to technical solutions of the present disclosure, a variety of structural methods and implementations that can be replaced with each other can be made by those skilled in the art without changing the spirit of the present disclosure. Therefore, the following specific embodiments and the accompanying drawings are only illustrative description of the technical solutions of the present disclosure, and should not be construed as the entirety of the present disclosure or as a limitation or restriction of the technical solutions of the present disclosure.

Orientation terms such as up, down, left, right, front, rear, front surface, rear surface, top, bottom, etc., which are mentioned or may be mentioned in this specification are defined relative to constructions illustrated in the accompanying drawings. They are relative concepts, and therefore are likely to change accordingly depending on different positions in which they are located or different states in which they are used. Therefore, these or other orientation terms should not be interpreted as restrictive terms.

As illustrated in FIG. 1 to FIG. 8, the present disclosure provides a wheel assembly device 10 which includes a connection base 1, a wheel assembly 2 that is deployable, and a positioning assembly configured to position the wheel assembly 2.

The wheel assembly 2 is movably connected to the connection base 1 and configured to switch between a deployed position and a storage position.

The connection base 1 has a positioning space 11. When the wheel assembly 2 is at the deployed position, the wheel assembly 2 is rotated to an interior of the positioning space 11. When the wheel assembly 2 is at the storage position, the wheel assembly 2 is rotated to an exterior of the positioning space 11.

The positioning assembly includes a first positioning member and a second positioning member. The first positioning member is configured to cooperate with the positioning space 11 to position the wheel assembly 2 at the deployed position.

The wheel assembly device 10 is configured to be mounted at a seat of a children's activity center and can facilitate a movement of the seat of the children's activity center.

Exemplarily, the wheel assembly device 10 includes the connection base 1, the wheel assembly 2, and the positioning assembly. The connection base 1 is connected to a bottom of the seat of the children's activity center. The connection base 1 has a base groove opened downwards. The wheel assembly 2 is mounted in the base groove. The positioning space 11 is formed at the base groove and in communication with the base groove.

The wheel assembly 2 has a connection portion connected to the connection base 1 and a rotating wheel portion that is rotatable. The wheel assembly 2 is rotatably connected to the base groove. That is, the wheel assembly 2 is rotatable in the base groove. The wheel assembly 2 is at the deployed position or the storage position when rotated. When the wheel assembly 2 is rotated to the deployed position, the connection portion of the wheel assembly 2 is located in the positioning space 11, and the rotating wheel portion of the wheel assembly 2 is located outside the positioning space 11 and is in contact with the ground. In this case, a friction with the ground is reduced, which facilitates a movement of the connection base 1. When the wheel assembly 2 is rotated to the storage position, both the connection portion and the rotating wheel portion of the wheel assembly 2 are located outside the positioning space 11. In this case, the connection portion or the connection base 1 of the wheel assembly 2 is in contact with the ground. Therefore, the friction with the ground is increased, which enables the connection base 1 to be placed stably on the ground.

The positioning assembly includes the first positioning member and the second positioning member. The first positioning member is configured to cooperate with the positioning space 11 to position the wheel assembly 2. The second positioning member is configured to cooperate with the first positioning member to position the wheel assembly 2. When the wheel assembly 2 is at the deployed position, the first positioning member cooperates with the positioning space 11 to keep the wheel assembly 2 stable and immobile at the deployed position. In this way, during a movement, the wheel assembly 2 is less likely to be rotated and stored after being subjected to an external force, which is convenient for use. When the wheel assembly 2 is at the storage position, the second positioning member cooperates with the first positioning member to keep the wheel assembly 2 stable and immobile at the storage position. The wheel assembly 2 is prevented from being stored after being subjected to the external force, which is convenient for use.

The wheel assembly device 10 arranged in this way has changed a conventional way of mounting a braking structure at the wheel assembly 2 and has a simpler structure. Therefore, the use of materials is reduced, which saves costs. In addition, the simpler structure is less prone to damages, which prolongs a service life.

The second positioning member is configured to cooperate with the first positioning member to position the wheel assembly 2 at the storage position.

Figure 2:
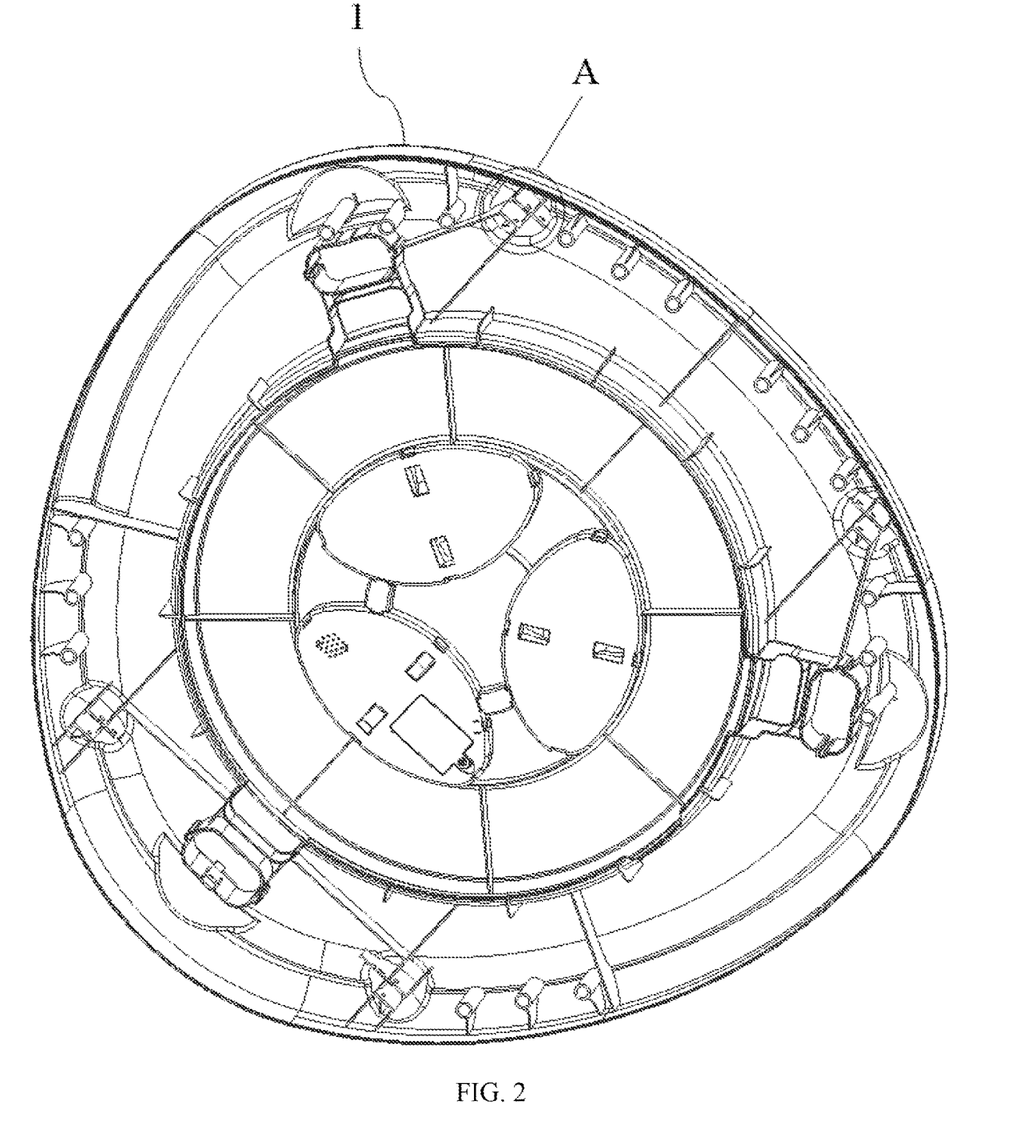
FIG. 2 is a schematic view of a connection base according to an embodiment of the present disclosure.
Figure 3:
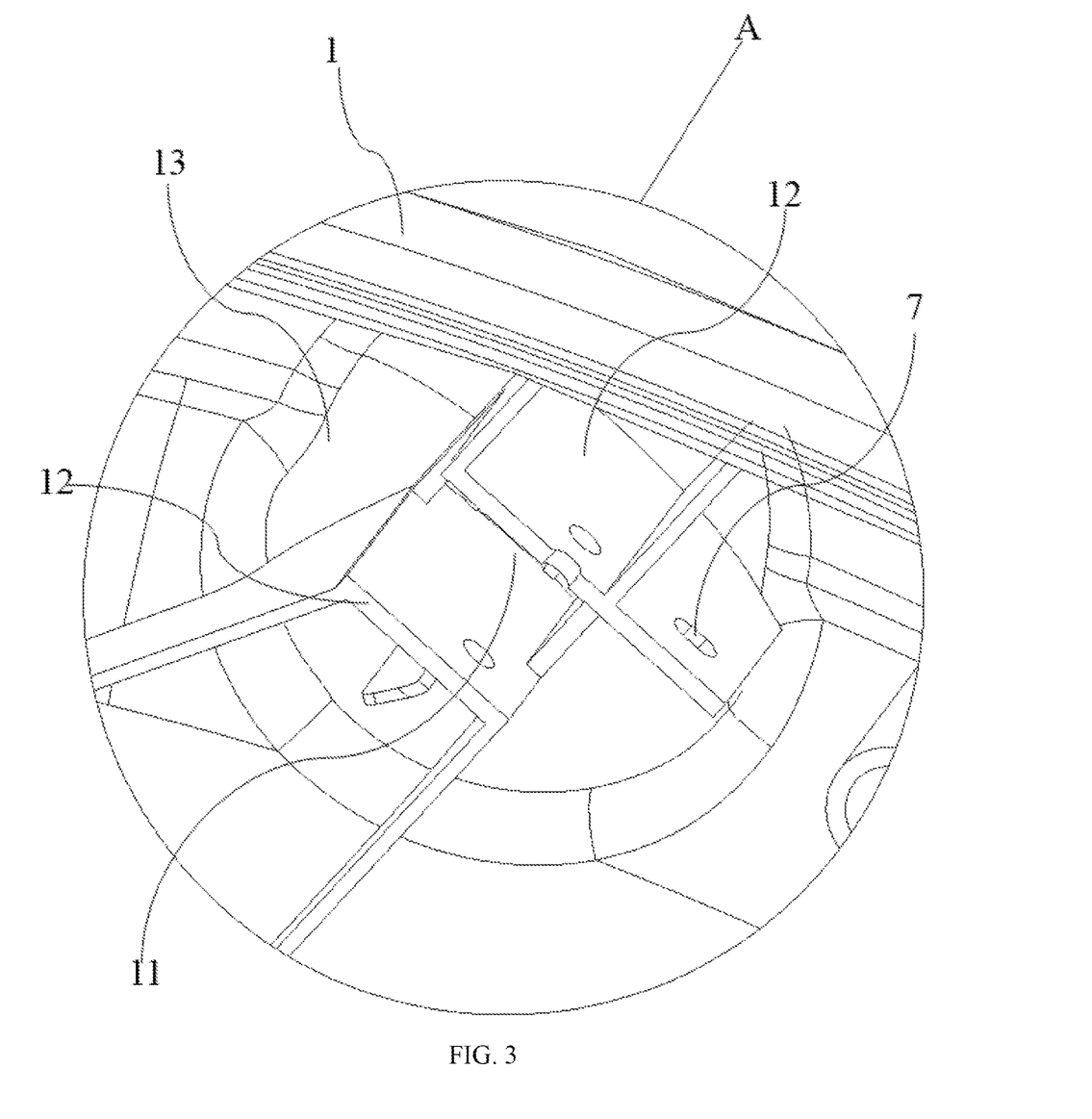
FIG. 3 is an enlarged view of part A in FIG. 2.

In an embodiment, as illustrated in FIG. 2. FIG. 3, and FIG. 5 to FIG. 8, the first positioning member includes a connection shaft 3 disposed at the connection base 1 and a sliding groove 4 formed at the wheel assembly 2. The connection shaft 3 is slidably connected to the sliding groove 4 to enable the wheel assembly 2 to move to the interior of the positioning space 11 or the exterior of the positioning space 11.

Two ends of the sliding groove 4 have a first engagement groove 41 and a second engagement groove 42, respectively. The first engagement groove 41 is located below the second engagement groove 42.

When the wheel assembly 2 is at the deployed position, the connection shaft 3 is engaged in the first engagement groove 41.

When the wheel assembly 2 is at the storage position, the connection shaft 3 is engaged and rotatable in the second engagement groove 42 to enable the wheel assembly 2 to switch to the deployed position.

In an exemplary embodiment of the present disclosure, the first positioning member is composed of the connection shaft 3 and the sliding groove 4. The connection shaft 3 is connected to the connection base 1. The sliding groove 4 is formed at the connection portion of the wheel assembly 2. The connection shaft 3 is inserted into and in a clearance fit with the sliding groove 4, in such a manner that the connection shaft 3 can slide in the sliding groove 4.

The sliding groove 4 has the first engagement groove 41 and the second engagement groove 42. The first engagement groove 41 is formed at a lower end of the sliding groove 4 and is in communication with the sliding groove 4. The second engagement groove 42 is located at an upper end of the sliding groove 4 and is in communication with the sliding groove 4. The connection shaft 3 is configured to be engaged in the first engagement groove 41. Further, the connection shaft 3 is configured to be engaged in the second first engagement groove 41 and is rotatably connected to the second engagement groove 42.

When the wheel assembly 2 is at the deployed position, the connection shaft 3 is engaged in the first engagement groove 41 and at least part of the wheel assembly 2 is located in the positioning space 11. When the wheel assembly 2 is switched from the deployed position to the storage position, the wheel assembly 2 is pulled downwards, and the connection shaft 3 is moved from the first engagement groove 41 into the sliding groove 4 and then slides through the sliding groove 4 into the second engagement groove 42. When the connection shaft 3 enters the second engagement groove 42, the wheel assembly 2 is located outside the positioning space 11. Then, the wheel assembly 2 is rotated to be connected to the second positioning member, thereby positioning the wheel assembly 2. The wheel assembly 2 is located at the storage position. In this way, a sufficient rotation space is provided for the wheel assembly 2, which facilitates an operation.

In an embodiment, as illustrated in FIG. 5 to FIG. 8, at least one connection opening 43 is formed between the first engagement groove 41 and the second engagement groove 42. A width of the connection opening 43 is smaller than a width of the first engagement groove 41 and/or a width of the second engagement groove 42. The connection opening 43 is compressed and deformed when the connection shaft 3 passes through the connection opening 43.

In an exemplary embodiment of the present disclosure, as an example, the connection opening 43 is formed between the first engagement groove 41 or the second engagement groove 42 and the sliding groove 4, and the connection opening 43 is formed between the first engagement groove 41 and the sliding groove 4. The first engagement groove 41 is in communication with the sliding groove 4 by the connection opening 43. The width of the connection opening 43 is smaller than each of the width of the first engagement groove 41 and a width of the sliding groove 4. When the connection shaft 3 is located in the first engagement groove 41, the connection opening 43 can block the connection shaft 3, in such a manner that the connection shaft 3 is less likely to be separated from the first engagement groove 41. When the connection shaft 3 enters the sliding groove 4 from the first engagement groove 41, the connection shaft 3 compresses the connection opening 43. The connection opening 43 is compressed and deformed. During a deformation of the connection opening 43, the width of the connection opening 43 is enlarged, allowing the connection shaft 3 to pass through the connection opening 43.

In an embodiment, as illustrated in FIG. 5 to FIG. 8, two connection openings 43 are formed between the first engagement groove 41 and the second engagement groove 42. One of the two connection openings 43 is formed between and in communication with the first engagement groove 41 and the sliding groove 4. Another one of the two connection openings 43 is formed between and in communication with the second engagement groove 42 and the sliding groove 4.

In an exemplary embodiment of the present disclosure, the two connection openings 43 are spaced apart from each other. For ease of description, the connection opening 43 between the first engagement groove 41 and the sliding groove 4 is defined as a first connection opening, and the connection opening 43 between the second engagement groove 42 and the sliding groove 4 is defined as a second connection opening. The first engagement groove 41 is in communication with the sliding groove 4 by the first connection opening. The second engagement groove 42 is in communication with the sliding groove 4 by the second connection opening. When the connection shaft 3 is located in the second engagement groove 42, the second connection opening can block the connection shaft 3, in such a manner that the connection shaft 3 is less likely to be separated from the second engagement groove 42. With the two connection openings 43, the connection shaft 3 can be reliably positioned both in the first engagement groove 41 and in the second engagement groove 42.

In an embodiment, as illustrated in FIG. 5 to FIG. 8, the wheel assembly 2 has a deformation space 5 located at a side of the sliding groove 4 to allow for a deformation of the connection opening 43. The deformation space 5 is located at a left side or a right side of the sliding groove 4 and is used to improve a deformation capability of the connection opening 43.

In another exemplary embodiment of the present disclosure, the deformation space 5 is made of a flexible material and integrally molded with the connection portion of the wheel assembly 2. A side wall of the deformation space 5 forms part of the connection opening 43. When the connection shaft 3 is located in the connection opening 43, the deformation space 5 is compressed and deformed.

In an embodiment, as illustrated in FIG. 5 to FIG. 8, the deformation space 5 includes two through holes spaced apart from each other. The sliding groove 4 is located between the two through holes.

In an exemplary embodiment of the present disclosure, the through hole is an elongated hole. The two through holes are located at the left side and the right side of the sliding groove 4, respectively, and are parallel to the sliding groove 4. A connection wall is formed between the through hole and the sliding groove 4. The connection opening 43 is formed between the two connection walls. The through hole is formed to reserve a space for a deformation of the connection wall, in such a manner that the connection wall has a predetermined degree of elasticity. When the connection shaft 3 passes through the connection opening 43, the connection shaft 3 compresses the connection wall. Part of the connection wall moves into the through hole to form a deformation, which enlarges the width of the connection opening 43. The deformation space 5 arranged in this way has a simple structure and reduces materials used for the manufacturing.

In an embodiment, as illustrated in FIG. 2, FIG. 3, and FIG. 5 to FIG. 8, the second positioning member includes a positioning protrusion 6 disposed at the wheel assembly 2 and a positioning portion 7 disposed at the connection base 1. When the wheel assembly 2 is at the storage position, the positioning protrusion 6 is engaged with the positioning portion 7 to position the wheel assembly 2 at the storage position.

In an exemplary embodiment of the present disclosure, the second positioning member is composed of the positioning protrusion 6 and the positioning portion 7. The positioning portion 7 may be a positioning recess or a positioning hole. For ease of description, as an example, the positioning portion 7 is the positioning recess.

The positioning protrusion 6 is disposed at the connection portion of the wheel assembly 2. The positioning recess is formed at the connection base 1. When the wheel assembly 2 is rotated to the storage position, the positioning protrusion 6 is engaged in a second recess. Therefore, the wheel assembly 2 remains positioned at the storage position, which is convenient for people to use.

In an embodiment, as illustrated in FIG. 5 to FIG. 8, the positioning protrusion 6 is an elastic block that has elasticity.

In an exemplary embodiment of the present disclosure, the elastic block is deformable and has an initial state and a compressed state. When the elastic block is in the initial state, the elastic block is engaged in the positioning recess. When the elastic block is in the compressed state, the elastic block is separated from the positioning recess.

As an example, the wheel assembly 2 is switched from the storage position to the deployed position. When the wheel assembly 2 is located at the storage position, the elastic block is in the initial state and is engaged in the positioning recess. When a position switch for the wheel assembly 2 is needed, an external force is applied to the wheel assembly 2 to rotate wheel assembly 2. When the wheel assembly 2 is rotated, the elastic block is in the compressed state since it is compressed, and then is separated from the positioning recess.

In another exemplary embodiment of the present disclosure, the elastic block is a rubber block.

In another exemplary embodiment of the present disclosure, the elastic block is an elastic plate having one end connected to the wheel assembly 2 and another end formed as an engagement end.

In an embodiment, as illustrated in FIG. 3 to FIG. 8, the connection base 1 is provided with at least two stop plates 12 extending downwards. The positioning space 11 is formed between the two stop plates 12. When the wheel assembly 2 is at the deployed position, the wheel assembly 2 is inserted into the positioning space 11, and the connection shaft 3 is engaged in the first engagement groove 41. The wheel assembly 2 is positioned at the deployed position under an action of the stop plate 12 and the first engagement groove 41. When the wheel assembly 2 is at the storage position, the connection shaft 3 moves from the first engagement groove 41 into the second engagement groove 42. The positioning protrusion 6 is engaged with the positioning portion 7 to position the wheel assembly 2 at the storage position.

In an exemplary embodiment of the present disclosure, the at least two stop plates 12 are disposed in the base groove of the connection base 1. The positioning space 11 opened downwards is formed between two adjacent stop plates 12. The connection shaft 3 is connected inside the base groove and located below the stop plate 12.

When the wheel assembly 2 is switched from the storage position to the deployed position, the connection shaft 3 is located in the second engagement groove 42 originally, and then the wheel assembly 2 is rotated downwards. In this case, the wheel assembly 2 is aligned with the positioning space 11. Then, the wheel assembly 2 moves upwards. The connection shaft 3 slides from the second engagement groove 42 into the first engagement groove 41 through the sliding groove 4. The connection portion of the wheel assembly 2 is inserted into the positioning space 11. The connection shaft 3 is engaged in the first engagement groove 41. Therefore, the wheel assembly 2 stays at the deployed position.

When the wheel assembly 2 is switched from the deployed position to the storage position, the wheel assembly 2 is pulled to slide downwards, and the connection shaft 3 slides from the first engagement groove 41 into the second engagement groove 4 through the sliding groove 4. Then, the wheel assembly 2 is rotated upwards. After the wheel assembly 2 is rotated upwards, the positioning protrusion 6 is engaged in the positioning portion 7 to keep the wheel assembly 2 at the storage position.

In an embodiment, as illustrated in FIG. 1 and FIG. 5 to FIG. 8, the wheel assembly 2 includes a roller 21 and a mounting base 22. The roller 21 is rotatably connected to a lower end of the mounting base 22. The mounting base 22 is rotatably connected to the connection base 1. When the wheel assembly 2 is located at the deployed position, at least part of the mounting base 22 is located in the positioning space 11, and the roller 21 is located outside the positioning space 11. When the wheel assembly 2 is located at the storage position, the mounting base 22 is located outside the positioning space 11.

In an exemplary embodiment of the present disclosure, the wheel assembly 2 is composed of the roller 21 and the mounting base 22. The mounting base 22 is the connection portion of the wheel assembly 2. The roller 21 is the rotating wheel portion of the wheel assembly 2. The mounting base 22 is rotatably connected to the connection base 1 by the connection shaft 3. The positioning protrusion 6, the first engagement groove 41, the second engagement groove 42, the sliding groove 4, and the through hole are formed at the mounting protrusion 6. The wheel assembly 2 arranged in this way has a simple structure, which facilitates manufacturing and production.

When the wheel assembly 2 is at the deployed position, the mounting base 22 is inserted into the positioning space 11 and the roller 21 is in contact with the ground. Therefore, the connection base 1 can be moved easily. When the wheel assembly 2 is at the storage position, the mounting base 22 is located outside the positioning space 11, and the mounting base 22 or the connection base 1 is in contact with the ground, allowing the connection base 1 to be stably placed on the ground.

Figure 1:
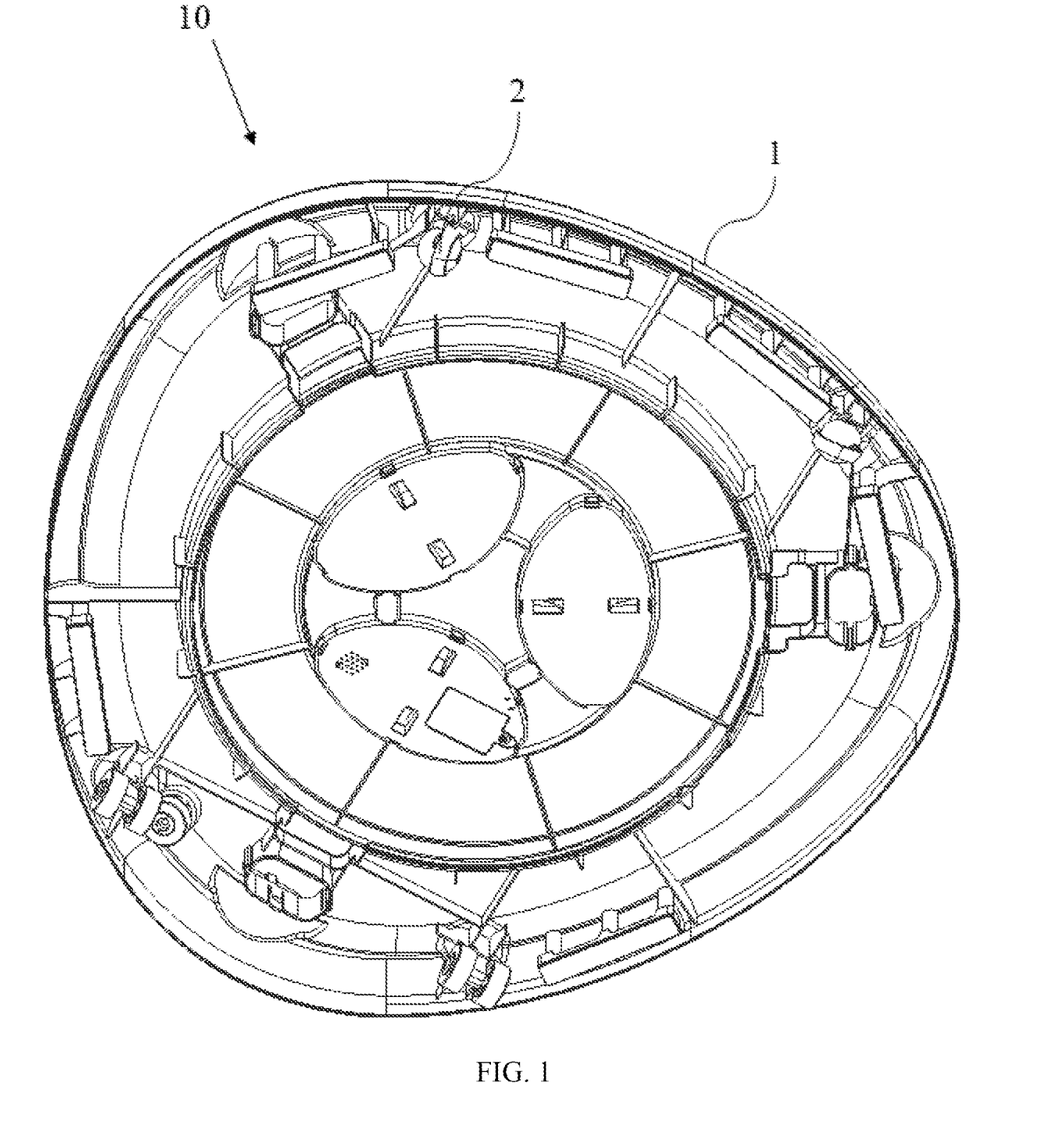
FIG. 1 is a schematic view of a wheel assembly device according to an embodiment of the present disclosure.
Figure 4:
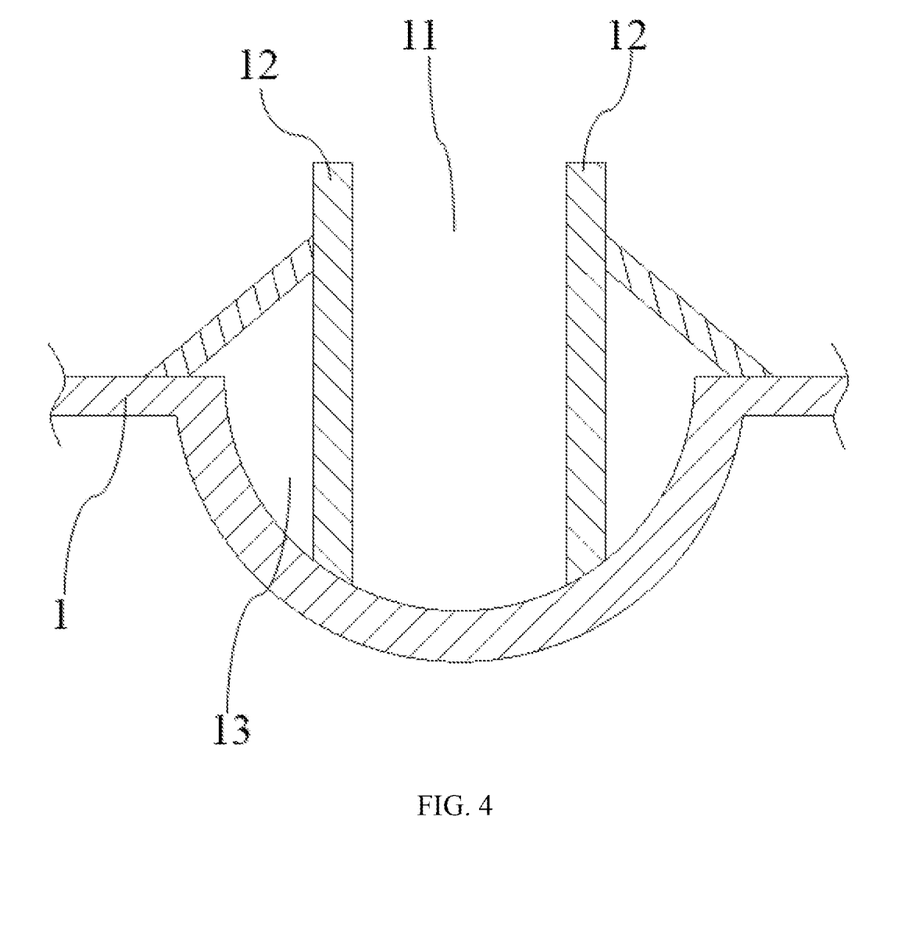
FIG. 4 is a schematic view of a positioning space and a stop plate according to an embodiment of the present disclosure.
Figure 5:
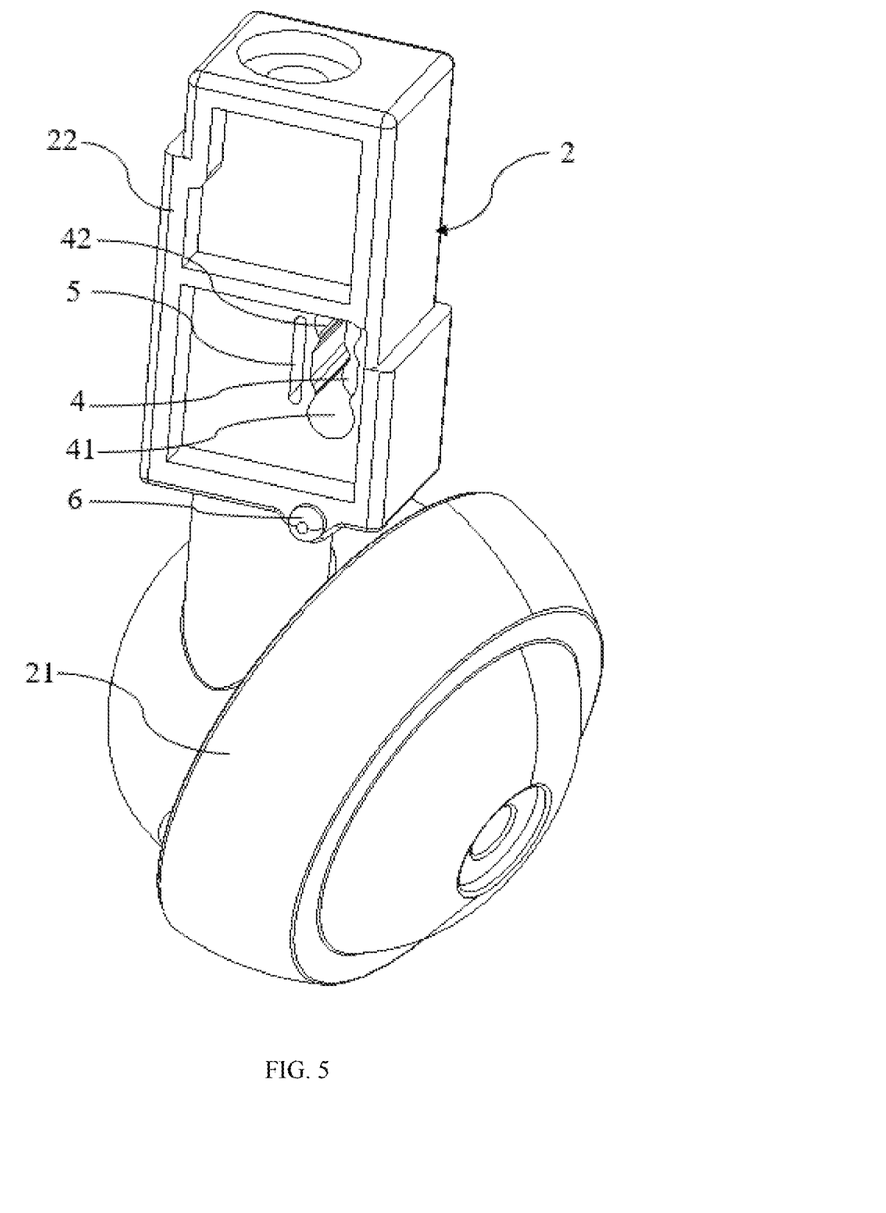
FIG. 5 is a schematic view of a wheel assembly according to an embodiment of the present disclosure.
Figure 6:
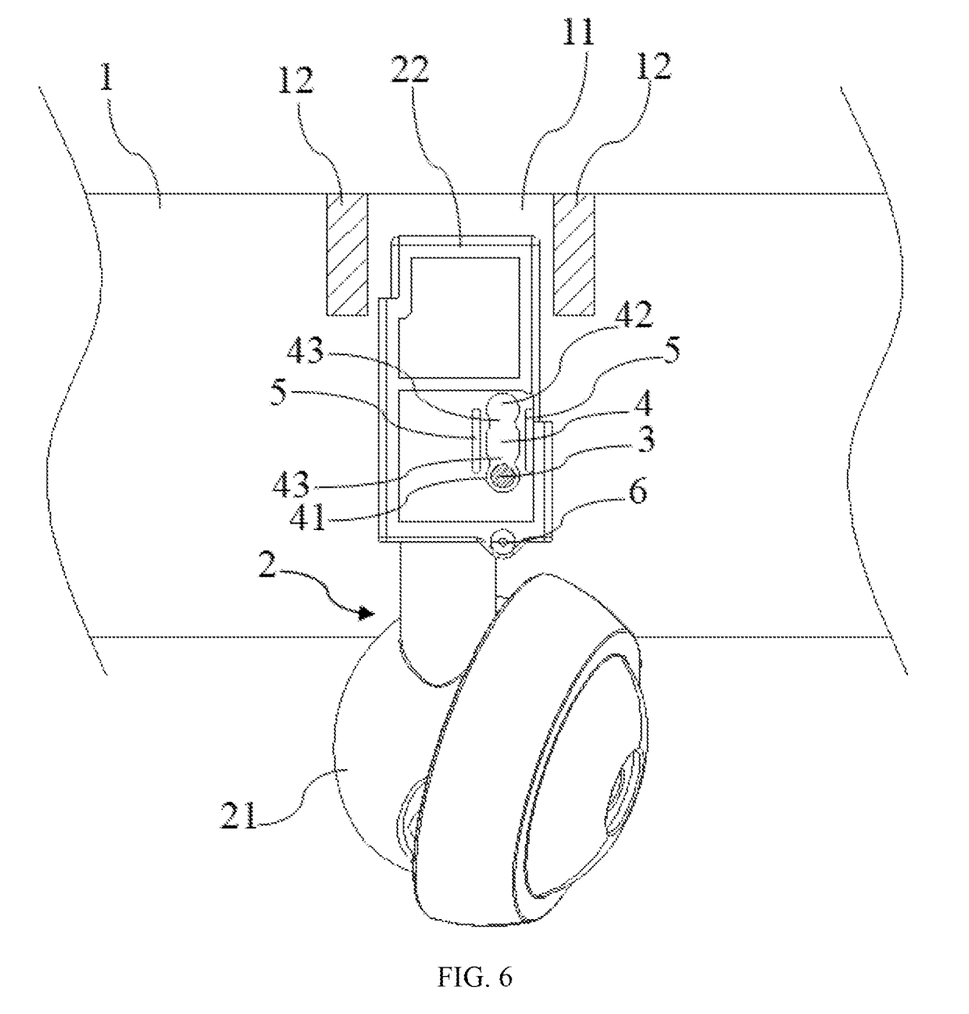
FIG. 6 is a schematic view of a wheel assembly at a deployed position according to an embodiment of the present disclosure.
Figure 7:
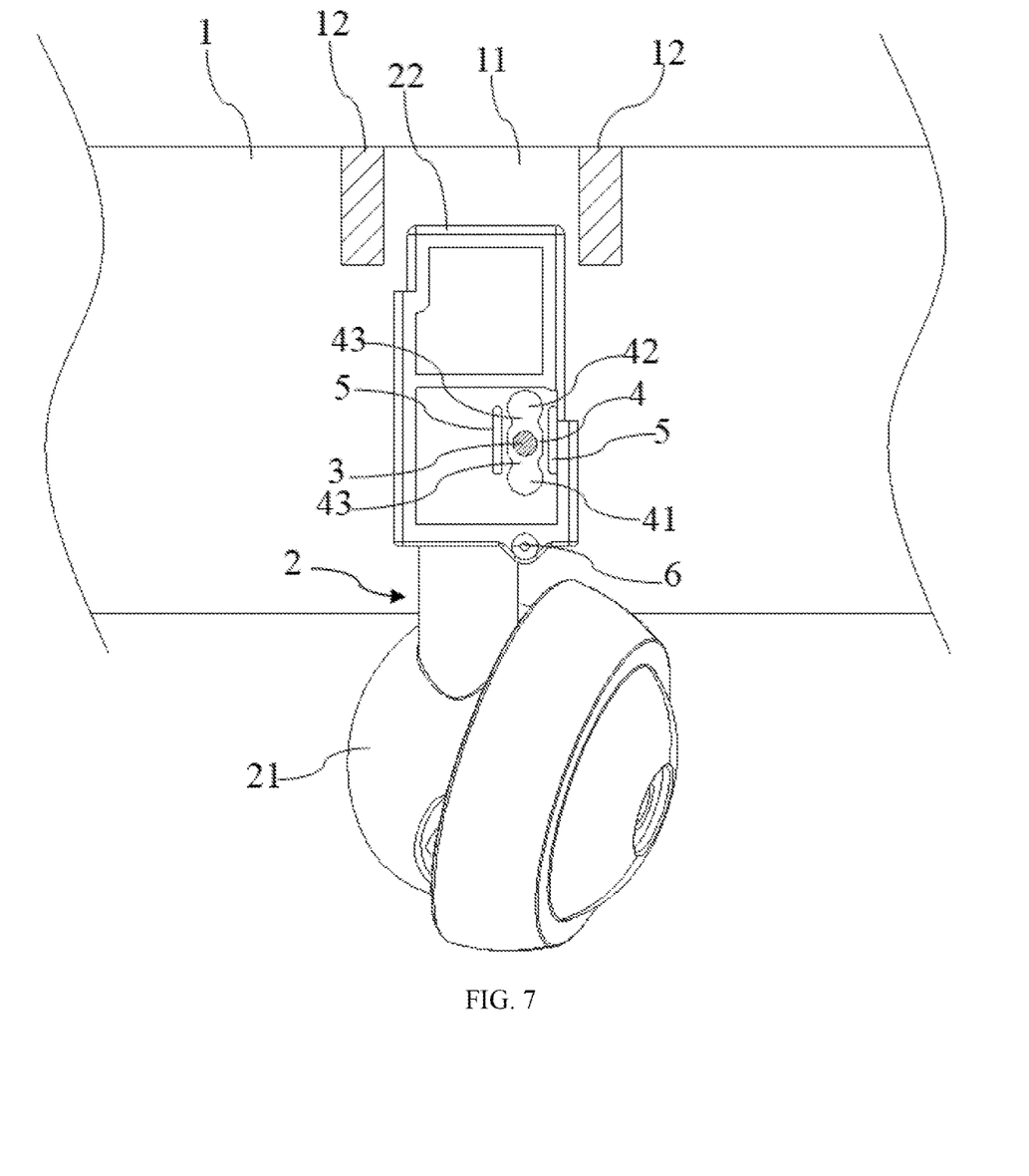
FIG. 7 is a schematic view of a position switch of a wheel assembly according to an embodiment of the present disclosure.
Figure 8:
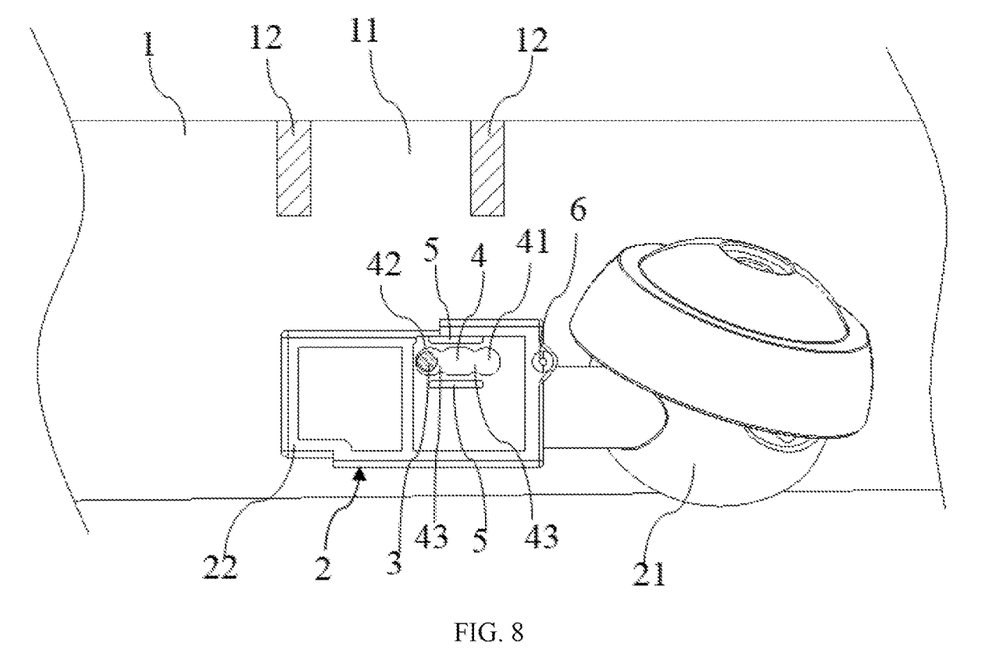
FIG. 8 is a schematic view of a wheel assembly at a storage position according to an embodiment of the present disclosure.

In an embodiment, as illustrated in FIG. 1 and FIG. 4, the connection base 11 has a ball socket 13 opened towards the stop plate 12. At least part of the stop plate 12 is connected inside the ball socket 13.

In an exemplary embodiment of the present disclosure, a wall surface of the connection base 11 is recessed to form the ball socket 13. The ball socket 13 is opened towards the wheel assembly 22. An upper end of the stop plate 12 is connected inside the ball socket 13 and defines a mounting position for the stop plate 12. Therefore, the stop plate 12 can be precisely mounted. In addition, since the ball socket 13 has a satisfactory mechanical property, a wall surface of the ball socket 13 can realize a better force distribution, better protecting the stop plate 12.

In an embodiment, as illustrated in FIG. 1 and FIG. 4, the connection base 11 is provided with a reinforcing rib. The reinforcing rib is connected to a side of the stop plate 12. One end of the reinforcing rib is connected to the stop plate 12. Another end of the reinforcing rib is connected to the connection base 11. Therefore, a connection between the stop plate 12 and the connection base 11 is reinforced, which improves structural strength of the stop plate 12 and making the stop plate 12 less susceptible to damages.

In summary, the present disclosure discloses the wheel assembly device 10. The wheel assembly device 10 includes the connection base 1, the wheel assembly 2 that is deployable, and the positioning assembly configured to position the wheel assembly 2. The wheel assembly 2 is movably connected to the connection base 1 and switchable between the deployed position and the storage position. The connection base 1 has the positioning space 11. When the wheel assembly 2 is at the deployed position, the wheel assembly 2 is rotated to the interior of the positioning space 11. When the wheel assembly 2 is at the storage position, the wheel assembly 2 is rotated to the exterior of the positioning space 11. The positioning assembly includes the first positioning member and the second positioning member. The first positioning member is configured to cooperate with the positioning space 11 to position the wheel assembly 2 at the deployed position. The second positioning member is configured to cooperate with the first positioning member to position the wheel assembly 2 at the storage position. The wheel assembly device 10 has a simple structure, satisfactory structural strength, and long service life. Through deploying or storing the wheel assembly 2, the connection base 1 can be moved on the ground or stably placed on the ground. In addition, with the positioning assembly and the positioning space 11, the wheel assembly 2 is kept stable at the deployed position and the storage position. Therefore, an operation is facilitated.

While the principle and several embodiments of the present disclosure have been described above, it should be noted that those skilled in the art can make various variants on a basis of the principle of the present disclosure. These variants are to be encompassed by the protection scope of present disclosure.

What is claimed is:

1. A wheel assembly device (10), comprising:
   a connection base (1);
   a wheel assembly (2) that is deployable; and
   a positioning assembly configured to position the wheel assembly (2), wherein:
   the wheel assembly (2) is movably connected to the connection base (1) and switchable between a deployed position and a storage position;
   the connection base (1) has a positioning space (11), the wheel assembly (2) being configured to rotate to an interior of the positioning space (11) when the wheel assembly (2) is at the deployed position, and rotate to an exterior of the positioning space (11) when the wheel assembly (2) is at the storage position; and
   the positioning assembly comprises a first positioning member and a second positioning member, the first positioning member being configured to cooperate with the positioning space (11) to position the wheel assembly (2) at the deployed position, and the second positioning member being configured to cooperate with the first positioning member to position the wheel assembly (2) at the storage position.

2. The wheel assembly device (10) according to claim 1, wherein the first positioning member comprises a connection shaft (3) disposed at the connection base (1) and a sliding groove (4) formed at the wheel assembly (2), the connection shaft (3) being slidably connected to the sliding groove (4) to enable the wheel assembly (2) to move to the interior of the positioning space (11) or the exterior of the positioning space (11), wherein:

two ends of the sliding groove (4) have a first engagement groove (41) and a second engagement groove (42), respectively, the first engagement groove (41) being located below the second engagement groove (42);

the connection shaft (3) is configured to engage in the first engagement groove (41) when the wheel assembly (2) is at the deployed position, and engage and rotate in the second engagement groove (42) to switch the wheel assembly (2) to the deployed position when the wheel assembly (2) is at the storage position.

3. The wheel assembly device (10) according to claim 2, wherein at least one connection opening (43) is formed between the first engagement groove (41) and the second engagement groove (42), the connection opening (43) having a width smaller than a width of the first engagement groove (41) and/or a width of the second engagement groove (42), and the connection opening (43) being compressed and deformed in response to the connection shaft (3) passing through the connection opening (43), wherein the wheel assembly (2) has a deformation space (5) located at a side of the sliding groove (4) to enable the connection opening (43) to be deformed.

4. The wheel assembly device (10) according to claim 3, wherein two connection openings (43) are formed between the first engagement groove (41) and the second engagement groove (42), one of the two connection openings (43) being formed between and in communication with the first engagement groove (41) and the sliding groove (4), and another one of the two connection openings (43) being formed between and in communication with the second engagement groove (42) and the sliding groove (4).

5. The wheel assembly device (10) according to claim 3, wherein the deformation space (5) comprises two through holes spaced apart from each other, the sliding groove (4) being located between the two through holes.

6. The wheel assembly device (10) according to claim 3, wherein:

the second positioning member comprises a positioning protrusion (6) disposed at the wheel assembly (2) and a positioning portion (7) disposed at the connection base (1); and the positioning protrusion (6) is configured to engage with the positioning portion (7) to position the wheel assembly (2) at the storage position when the wheel assembly (2) is at the storage position.

7. The wheel assembly device (10) according to claim 6, wherein the positioning protrusion (6) is an elastic block that has elasticity.

8. The wheel assembly device (10) according to claim 6, wherein:

the connection base (1) is provided with at least two stop plates (12) extending downwards, the positioning space (11) being formed between the two stop plates (12);

when the wheel assembly (2) is at the deployed position, the wheel assembly (2) is inserted into the positioning space (11), and the connection shaft (3) is engaged in the first engagement groove (41), the wheel assembly (2) being positioned at the deployed position under an action of the stop plates (12) and the first engagement groove (41); and when the wheel assembly (2) is at the storage position, the connection shaft (3) moves from the first engagement groove (41) into the second engagement groove (42), the positioning protrusion (6) being engaged with the positioning portion (7) to position the wheel assembly (2) at the storage position.

9. The wheel assembly device (10) according to claim 1, wherein:

the wheel assembly (2) comprises a roller (21) and a mounting base (22), the roller (21) being rotatably connected to a lower end of the mounting base (22), and the mounting base (22) being rotatably connected to the connection base (1);

when the wheel assembly (2) is located at the deployed position, at least part of the mounting base (22) is located in the positioning space (11), and the roller (21) is located outside the positioning space (11); and when the wheel assembly (2) is located at the storage position, the mounting base (22) is located outside the positioning space (11).

* * * * *